United States Patent [19]

Sousek

[11] Patent Number: 4,598,535
[45] Date of Patent: Jul. 8, 1986

[54] ADJUSTABLE MULTIPLE ROW HARVESTER HEAD ASSEMBLY

[75] Inventor: Eugene A. Sousek, Appleton, Wis.

[73] Assignee: Piper Industries, Inc., Dallas, Tex.

[21] Appl. No.: 670,080

[22] Filed: Nov. 13, 1984

Related U.S. Application Data

[63] Continuation of Ser. No. 419,482, Sep. 17, 1982, Pat. No. 4,531,351.

[51] Int. Cl.⁴ .................................. A01D 45/02
[52] U.S. Cl. ............................................ 56/98
[58] Field of Search .............. 56/98, 119, 14.3, 60, 56/103, 102, 106

[56] References Cited

U.S. PATENT DOCUMENTS

| | | | |
|---|---|---|---|
| 3,520,121 | 7/1970 | Ashton et al. | 56/98 |
| 4,084,396 | 4/1978 | Fritz et al. | 56/98 |
| 4,086,749 | 5/1978 | Greiner et al. | 56/98 |

Primary Examiner—Jay N. Eskovitz
Attorney, Agent, or Firm—King and Schickli

[57] ABSTRACT

An adjustable multiple row head assembly for a crop harvester provides cantilevered support arms for a plurality of row head units. The units are adjustably positioned for harvesting crops planted in differently spaced rows. An adjusting device for the row head units provides infinitely variable adjustment, and specifically includes a jackscrew operating between a moveable frame member of the row head unit and the fixed cantilevered support arm therefor. The row head units extend in a fore-and-aft direction with respect to a base and include gathering conveyors driven by sprockets. The conveyors cooperatively form passageways having inlets for the crop, and engage idler sprockets adjustable in accordance with the row head unit adjustment to maintain proper tension in the conveyors. The adjustable row head units pivot about an axis forwardly of the driving sprockets for the conveyors thereof, thus discharging the crop at substantially the same point, direction and orientation with respect to the cutting or chopping inlet of the harvester.

6 Claims, 7 Drawing Figures

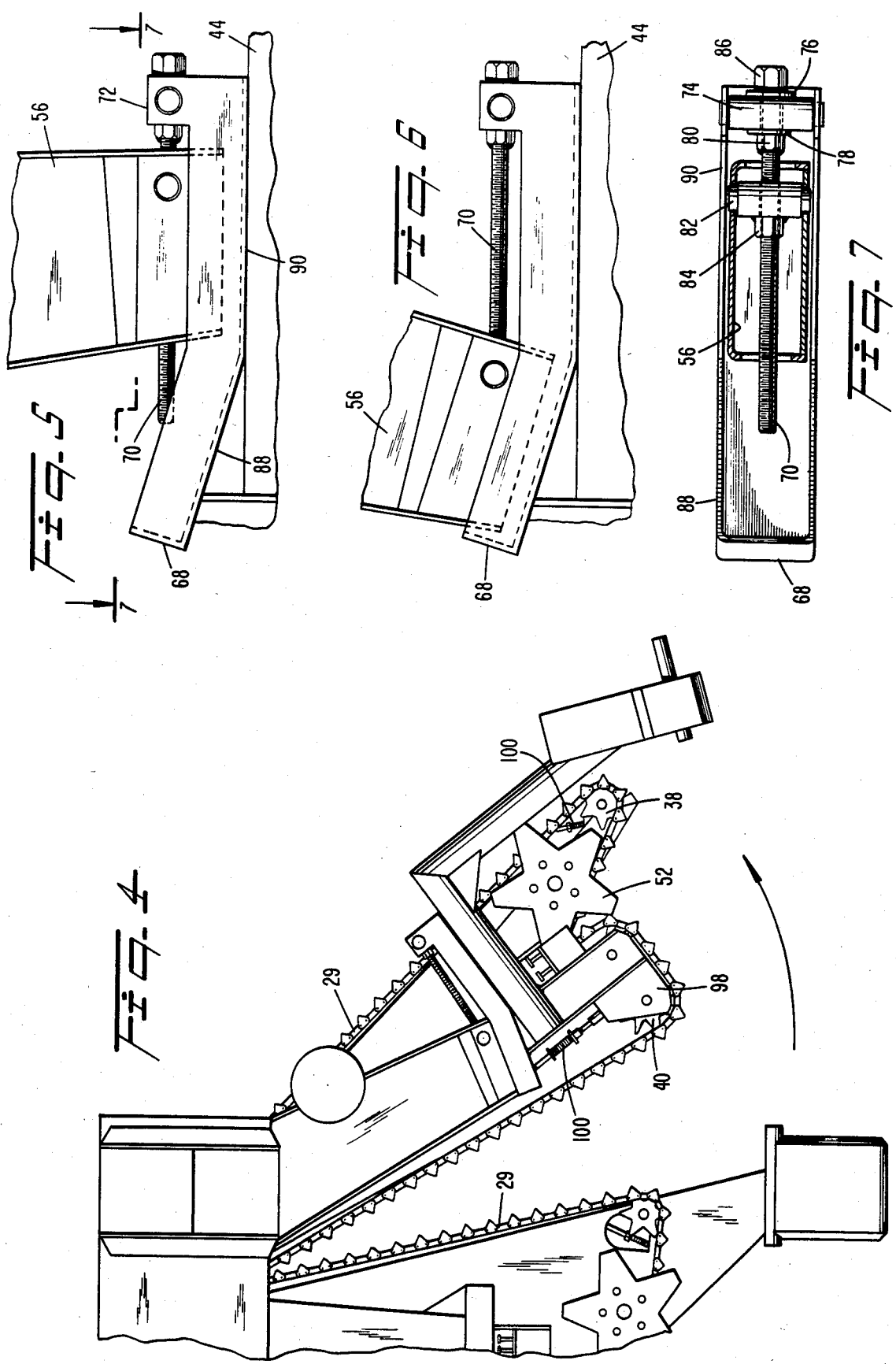

ADJUSTABLE MULTIPLE ROW HARVESTER HEAD ASSEMBLY

This is a continuation of application Ser. No. 419,482, filed Sept. 17, 1982, now U.S. Pat. No. 4,531,351.

TECHNICAL FIELD

The present invention relates to harvesting apparatus for row crops, and more particularly to a head assembly with pivotally adjustable head units for use in harvesting crops planted in multiple rows.

BACKGROUND ART

In harvesting of crops planted in multiple rows, it is known to use multiple row harvesting heads in a harvesting apparatus. Such multiple row heads enable simultaneous harvesting of crops greatly increasing the efficency of the operation. Because the distances between various rows may differ for different crops, and may even differ for different rows of the same crop, such as in different fields, the invention of adjustable multiple row heads for such harvesting has naturally evolved. Such adjustable heads typically fall into one of two categories. In a first type of multi-row head, the various row units may be adjustably spaced from one another by selectively sliding the units to one of a plurality of available positions. In a second type of adjustable multi-row harvesting head, the row units may be pivoted to specific predetermined locations, thereby to provide a number of predetermined spacings between the inlets to the row units.

Units of the first type are illustrated by U.S. Pat. No. 4,115,983 to Barnes et al., and U.S. Pat. No. 3,520,121 to Ashton et al. Units of the second type are illustrated by U.S. Pat. No. 4,084,396 to Fritz et al., and U.S. Pat. No. 4,086,749 to Greiner et al.

The prior art devices, however, suffer from a number of deficiences. None of the previously known multiple row harvesting units are capable of, or include, adjusting devices for achieving infinite adjustment and variation of the spacing between the multiple row unit. Without such infinitely variable adjustment, the multiple units are constrained to operate at predetermined spacings which may differ from actual row spacings found on a farm to be harvested. Also, the adjusting mechanism typically involves a plurality of nuts and bolts or similar fasteners that are apt to be lost or misplaced. Under circumstances where infrequent changes are made, the fasteners are likely to become difficult to loosen for adjustment costing the farmer valuable harvest time.

Additionally, the prior art devices tend to have bulky and cumbersome supporting frame structures for the head units or modules, tending to increase the cost of manufacture and weight of the assembly. Perhaps more imporantly, the frame structures previously known allow accumulation of grasses, weeds and other trash leading eventually to clogging of the crop gathering belts or chains. This is especially true of the harvesters having cantilever-type structures for pivotal modules, as shown in the Fritz et al '396 and the Greiner et al '749 patents.

Still further, the prior art devices tend to supply the forage to the cutting station within the harvester apparatus at different locations and orientations. For example, in the case of multiple row harvesters having slideably adjusted row units, the rear discharge portion of the row unit is slideably mounted, thereby varying the location of the point at which the forage is received by the harvester. To overcome such difficulties, pivotably adjustable multiple row units typically provide for pivoting of a row unit about the axis of a rear drive sprocket for a gathering belt or chain therein, as illustrated by the disclosure of Fritz et al U.S. Pat. No. 4,084,396 referenced above. In such structures, however, the discharge angle, or orientation, of the gathering means and a passageway formed thereby differs for different adjustments of the row unit. Thus, even for harvesters having feeding inlets fixed behind the row units, the provision of the harvested forage at different angles of attack leads to incomplete or difficult acceptance of the material by the harvester thereby leading to buildup of unaccepted forage adjacent the feeding openings therefor, and ultimately to jamming of the equipment.

There is thus a need for multiple row harvesting equipment having infinitely variable adjustments for the various row units thereof, as well as for such equipment having an improved support frame particularly adapted for combining with the adjustment mechanism and tending to remain trash-free and accept all of the forage gathered and severed.

DISCLOSURE OF THE INVENTION

It is accordingly a primary object of the present invention to provide a multiple row harvesting unit overcoming the above described difficulties of the prior art.

It is a more specific object of the invention to provide a multiple row harvesting unit having infinitely variable adjustment of the spacing between the various row units and without the use of fasteners.

It is still a further object of the invention to provide a multiple row harvesting head incorporating a frame structure providing individual cantilever supports for the new modules and eliminating cross structures where crop grasses and trash can accumulate and be deflected into the path of the gathering belts and the supporting rollers.

It is still another object of the invention to provide a multiple row harvesting head in which forage is provided and discharged into the cutter mechanism of the harvester at essentially constant points and at constant orientations, independently of the locations and adjustments of the row modules.

Additional objects, advantages and other novel features of the invention will be set forth in part in the description which follows and in part will become apparent to those skilled in the art upon examination of the following, or may be learned with the practice of the invention. The objects and advantages of the invention may be realized and obtained by means of the instrumentalities and combinations particulary pointed out in the appended claims.

To achieve the foregoing and other objects, and in accordance with the purpose of the present invention as embodied and broadly described herein, the adjustable multiple row harvester head assembly of the invention includes an adjusting means for providing infinitely variable adjustment to a frame member supporting the gathering means of the adjustable modules. The infinitely variable adjustment of the moveable frame member is provided, for example, on the right and left side modules (outside modules) of a three row harvester.

To provide improved trash-free operation, the support arm for each row unit is indivudally cantilevered forwardly from the base of the head that is attached to the harvester. The moveable frame member supports the gathering means, such as cooperating endless belts or chains, forming an inlet and a passageway for crops to be chopped by the cutter head inside the harvester.

Preferably, the adjusting means for each frame member comprises a jackscrew connecting the moveable frame member to the cantilevered support arm. The jackscrew may be connected to one point on a guide means fixed to the frame member and to another point on the cantilevered support arm. At least one of the two connection points for the jackscrew provide a threaded engagement for infinite adjustment of the frame member. The guide means is formed as a channel for sliding engagement of the forward or distal end of the cantilevered support arm. Preferably, the channel includes an elbow rather than a continuous curve, for ease in manufacture and to provide sufficient space along the legs thereof for free movement with respect to the support arm.

In accordance with yet another feature of the invention, the gathering means for the crops is comprised of a pair of endless gathering members (belts or chains) having cooperating lugs thereon and forming the feed passageway therebetween. Driving sprockets for the endless gathering members are supported by a transverse member of the harvester head base. Driven or idler sprockets are provided adjacent the inlet of the gathering means, and adjustable idler sprockets are included for adjusting the slack in the gathering members as the head units are adjusted. Preferably, the adjustable idler sprocket assemblies include adjustable bracket means for automatically adjusting the slack responsively to the adjustment of the row head units.

In accordance with yet another object of the invention, the pivot mounting for the moveable frame member within each head unit is disposed forwardly of the driving sprocket, thus to provide the desired near constancy in orientation of discharge from the passageway to the cutter mechanism of the harvester.

Still other objects and features of the present invention will become more readily apparent to those skilled in the art from the following description wherein there is shown and described a preferred embodiment of the invention, simply by way of illustration of one of the modes contemplated to be best for carrying out the invention. As will be realized, the invention is capable of other, different, embodiments and its several details are capable of modifications in various obvious aspects, all without departing from the invention. Accordingly, the drawings and descriptions will be regarded as illustrative in nature and not as restrictive.

BRIEF DESCRIPTION OF THE DRAWINGS

The accompanying drawings, incorporated in and forming a part of the specification, illustrate several aspects of the present invention, and, together with the description, serve to explain the principles of the invention.

In the Drawings:

FIG. 4 shows a partial view of an alternate embodiment of the structure of FIG. 3, arranged for harvesting widely spaced rows of crops;

FIGS. 5 and 6 illustrate a jackscrew mechanism for providing infinitely variable adjustment of the inventive apparatus, as adjusted for narrow and wide rows, respectively; and FIG. 7 shows a different view of the jackscrew mechanism taken along lines 7—7 in FIG. 5.

Best Mode for Carrying Out the Invention

Figure 1:
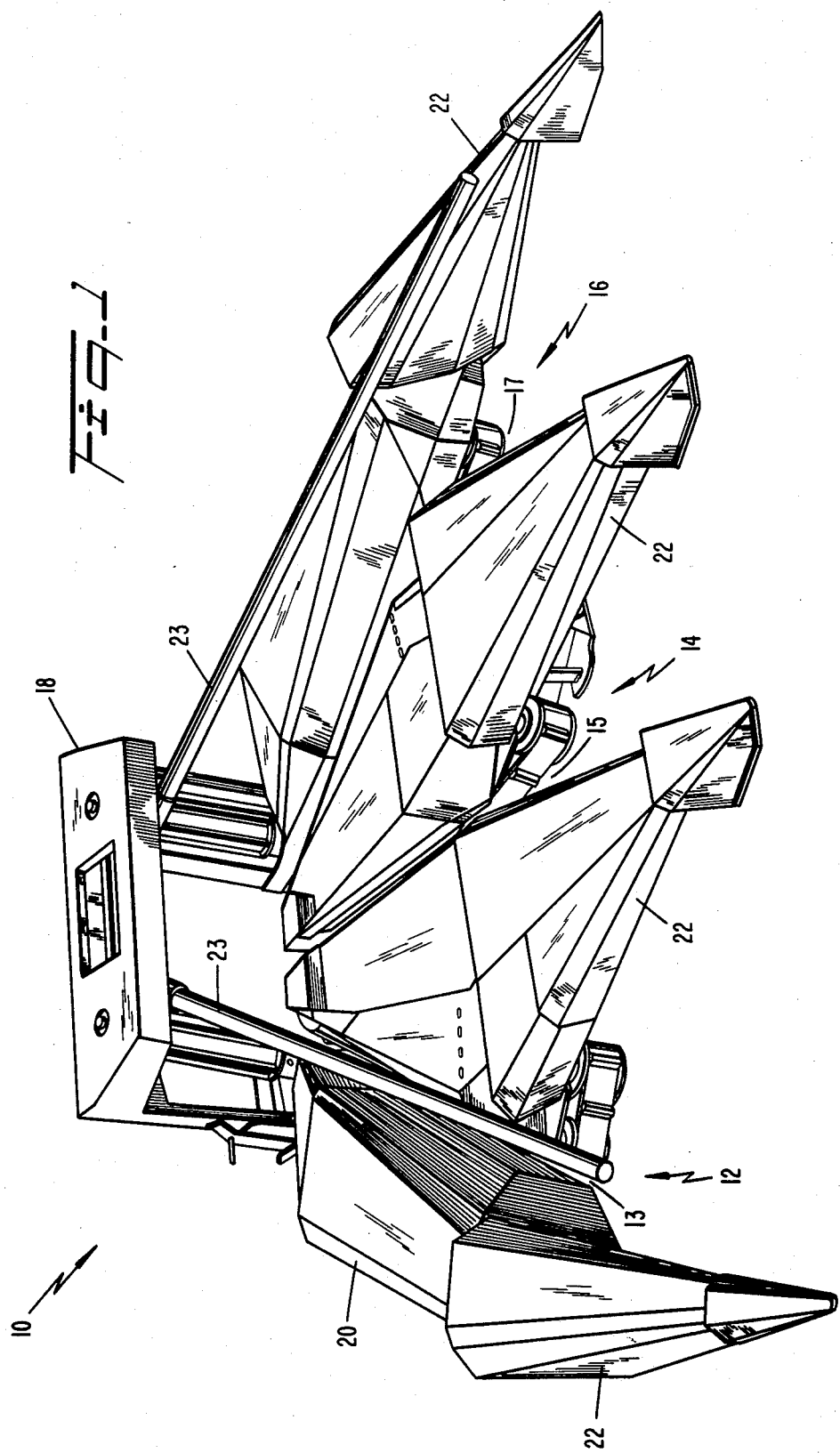
FIG. 1 provides a perspective view of an adjustable, multi-row head assembly according to the invention.

Referring now to FIG. 1, an adjustable, multi-row head for a harvester apparatus is generally shown at 10 in perspective, and includes a number of row units or modules 12, 14 and 16, having inlets 13, 15 and 17, respectively, adjustably spaced with respect to one another. A head base 18 is shown as providing support for the multiple row units and for attachment to a harvester apparatus (not shown). An adjustable sheet metal covering structure 20 generally provides hoods and snouts 22 for covering the various components of the row units and for guiding the crops towards the inlets thereof. Additionally, guide bars 23 are provided adjacent each of the outer row units of the apparatus. Guide bars 23 retain and laterally support the stalks during passage through the outer row units from the inlets thereof to the harvester inlet openings.

Figure 2:
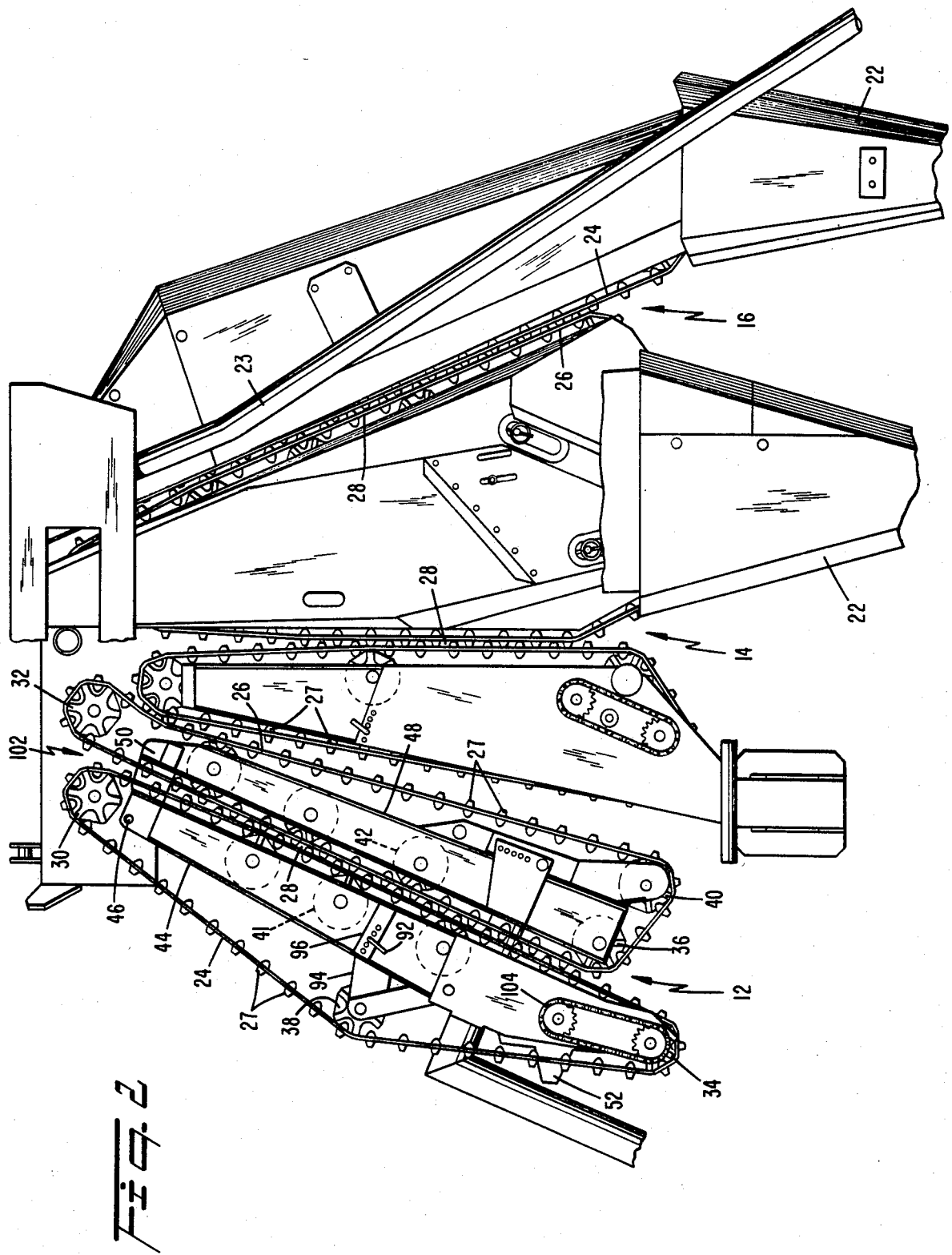
FIG. 2 provides a top view of one embodiment of the adjustable multi-row head assembly of FIG. 1 having some of the covering sheet metal thereof removed.

Referring now to FIG. 2, there is shown a top view of one embodiment of the present invention in which the several row units are adjusted for harvesting narrowly spaced rows, and in which the sheet metal is partially removed. As shown in the figure, three row units are included, the central row unit 14 being maintained at a fixed location, while the two outer (left and right) units 12 and 16 are adjustable to be variably spaced relative to the central unit 14.

As seen from FIG. 2, each of the adjustable row units includes an outer and an inner gathering member, 24 and 26, respectively. The gathering members are used for gathering the crops being harvested, and cooperate to form passageway 28 therebetween.

The gathering members are shown as endless conveyors of flexible belts having a plurality of lugs 27 disposed thereon. However, although flexible belts are shown in the embodiment of FIG. 2, it should be appreciated that chains may be used for the same purpose. Thus, the embodiment of FIG. 4 illustratively shows the use of such chains for the gathering members. The chains have cooperating triangular lugs for gripping the crops and for conveying the same from the inlet of the row unit passageway to the outlet thereof adjacent the harvester inlet. Such a chain is partially shown at 29 in FIG. 4.

With reference back to FIG. 2, gathering members 24 and 26 are driven by sprockets 30 and 32, respectively. These members engage the driving sprockets at the discharge end 102 of passageway 28. Driven or idler sprockets 34 and 36, respectively, are mounted at the forward or inlet ends of the row units. Additionally, adjustable idler sprockets are provided at 38 and 40, for adjustment of slack in the gathering members resulting from adjustment of the lateral spacing between the row units. Additionally, other idler sprockets may be provided for maintaining the gathering members in appropriate juxtaposition to form the passageway 28. Idlers 41 and 42 are illustratively labeled for that purpose.

In FIG. 2, moveable frame member 44, 48 is illustrated pivotally mounted at 46 and includes mounting structure for both gathering members or belts 24, 26. The adjustable idler sprockets 38, as well as forward idler sprockets 34 and 36, and idlers 41 and 42 are carried on the frame member. The two sections 44, 48 are joined at the rear, such as by bracket 50.

Figure 3:
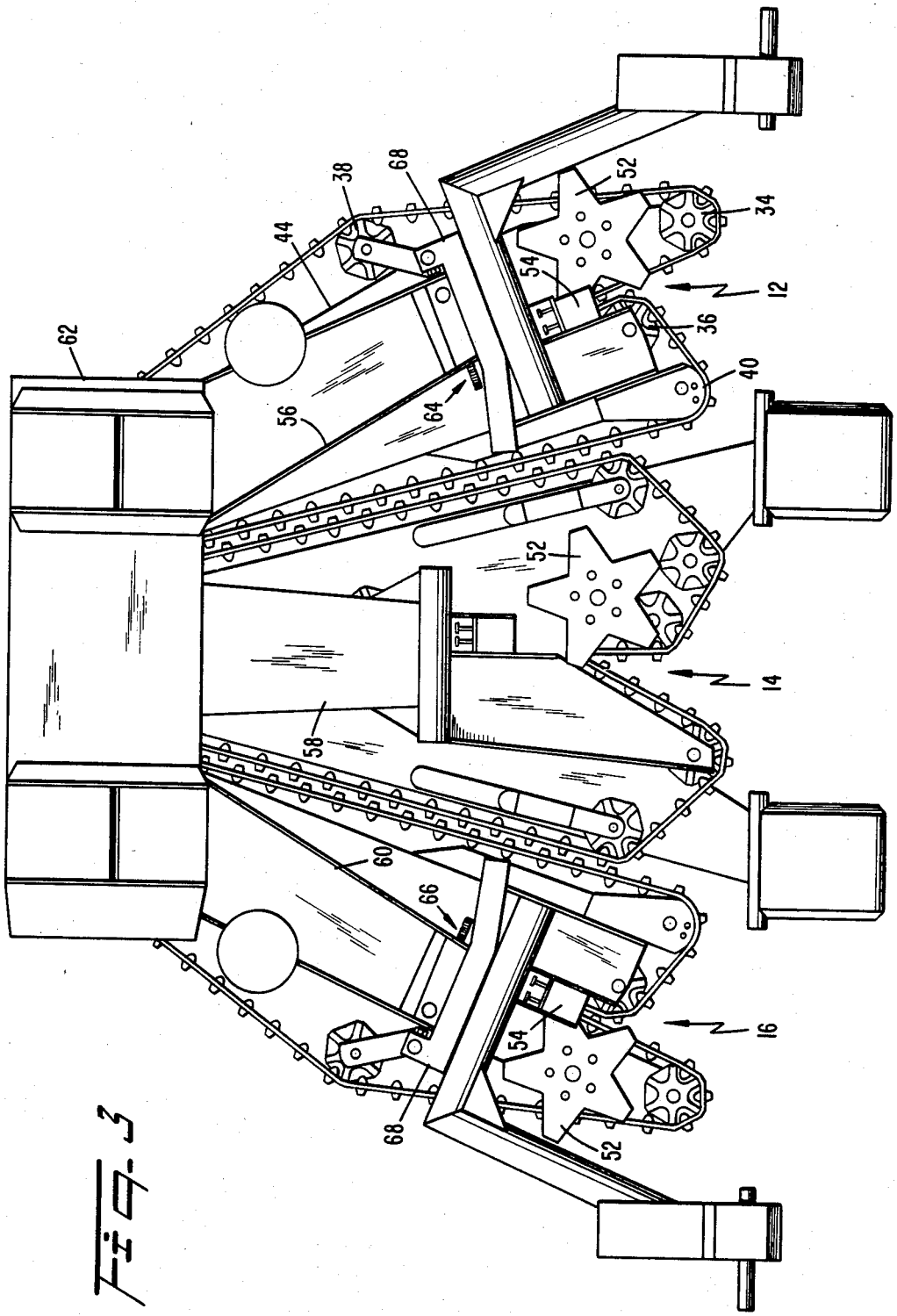
FIG. 3 shows a bottom view of the structure of FIG. 2, arranged for harvesting narrowly spaced rows of crops.

As shown in the bottom view of FIG. 3, rotary cutters are provided at the mouth of each row unit. Specifically, a rotating cutter 52 is provided at the inlets 12, 14, 16 of each row unit. The rotating cutter 52 cooperates with a stationary cutting knife 54 for severing the stalks of the crop being harvested. As is well known in the art, the severed forage is gripped by the gathering members of each row unit, illustrated by 24 and 26 for unit 16, and transported rearwardly and upwardly to the discharge end 102 of the passageway 28. It is recognized that, subsequent to severing by the rotating cutters 52, substantially all of the harvested forage extends above gathering members 24 and 26 ready to be fed cut-end first into the harvester.

As is further seen in FIG. 3, the three row units 12, 14 and 16 are supported by three cantilevered arms 56, 58 and 60. Arms 56, 58 and 60 extend forwardly from the base 62.

The improved adjustable movement of the row units is provided by an adjusting mechanism shown for left and right units 12 and 16. As shown in FIG. 3, the adjusting means 64 and 66 each include a channel 68 engaging a distal end of the cantilevered arm, positioned well forward of the base 62. The channels 68 are attached to the moveable frame members for the gathering belts. Note that the channels stop short of the return run of the gathering members so that there is no obstruction extending across the width of the head assembly upon which trash can accumulate. The return runs of the belts between the outer units 12, 16 and the central unit 14 are free of adjacent obstruction, and thus self cleaning of cut grasses or the like. With this individual cantilever support arm design, there is greatly minimized incidence of winding of the grass or other trash on the pulleys and other rotating parts of the unit.

As is best seen in FIGS. 5, 6 and 7, the adjusting means each include a jackscrew 70 therein. The jackscrew is journaled on the channel 68 at location 72 including a pivotal mounting. As is best seen in FIG. 7, the pivotal mounting includes a swing shaft 74 which holds the jackscrew in position by means of a pair of washers 76 and 78 and a nut 80. The jackscrew passes non-threadedly through the opening in the shaft 74, and is threadedly engaged to moveable swing shaft 82 provided in cantilevered arm 56. The driving engagement with this swing shaft is provided by a welded threaded nut 84, as shown in FIG. 7.

In operation, the head 86 of the jackscrew 70 is engaged by a wrench, which may be a socket wrench with an extender therefor if necessary to reach past the sheet metal enclosures. The jackscrew is rotated clockwise or counterclockwise to urge swing shaft 74 and channel 68 toward or away from cantilevered arm 56. For example, clockwise motion of a right-hand threaded jackscrew will cause swing shaft 74, channel 68 and moveable frame member 44, 48 attached thereto to move towards cantilevered arm 56. Moveable member 44, 48 in turn pivots at 46, thereby causing the row unit 12 to shift toward the center row unit 14. When adjusted for the narrowest spacing between the two units, channel 68 is positioned as shown at FIGS. 3 and 5 (note relationship to cantilevered arm 56).

Upon counterclockwise rotation of jackscrew 70, the orientation of channel 68 changes so that, when arranged as shown in FIG. 6, the outer row unit is adjusted to have its inlet furtherest removed from the adjacent inlet, thereby providing harvesting for the most widely spaced crop rows. Because of the nature of the adjusting units in which jackscrews are used, it will be appreciated that the relative positioning of channel 68 and cantilevered arm 56 may be infinitely varied to any position between the two extremes shown in FIGS. 5 and 6. The present appratus thus provides an infinitely variable adjustment between the adjustment for the most narrowly spaced rows, shown at FIG. 3, and the adjustment for the most widely spaced rows, shown at FIG. 4. The adjustment may be effected in a rapid fashion and without difficulty since there are no separate fasteners involved.

Referring specifically to the adjusting units of FIGS. 5-7, it is seen that channels 68 are formed with an elbow, and are provided with two leg sections 88 and 90. This channel design provides an efficient structure for guiding the frame member with respect to the corresponding cantilever arm. Sufficient free space is provided along both legs to permit free relative movement of the cantilevered arm with respect to the channel 68, while at the same time, permitting ease in manufacture of the device.

Referring once again to FIG. 2, the various sheet metal panels covering the row units are seen to include a number of joints, not referenced, permitting slideable engagement of the overlapping panels in accordance with the lateral spacing of the row units. The snouts provided forwardly of the inlets, as well as the sheet metal panels over the rear portion of the units effectively guide the crop and prevent entanglement of the crop in the moving parts of the row units.

In the embodiment shown at FIGS. 2 and 3, adjustable idler sprockets 38 and 40 may be manually positioned by the use of locking pins, such as shown at 92 for locking a support bracket 94 carrying sprocket 38 into a number of positions determined by multiple apertures in strap 96. Alternatively, as shown in FIG. 4, the idler sprockets may be differently located and mounted on a pivotal bracket, such as shown at 98, and urged against the conveyor by a spring biased arm 100. In this arrangement, tension of the gathering members is automatically maintained, and slack compensated for, by action of the spring biased arm whenever the row units are repositioned.

With particular emphasis on pivot point 46 for the row unit shown in FIG. 2, it is noted that an advantage of the forward location thereof with respect to driving sprockets 30 and 32 is that any rotation of moveable frame member 44, 48, and thus of row unit 12, 16, results in a reduced change in the angle of approach of gathering members 24 and 26 to the sprockets. Hence the rearward or discharge end shown at 102 for the passageways 28, remains closer and better aligned with the receiving point for the cutter mechanism in the harvester in comparison with the prior art where pivoting of a row unit about an axis or axes coinciding with one or more of the axes of driving sprockets 30 and 32. As can best be seen in FIG. 2, the forward pivot 46 and the guiding function of frame member 44, 48 allows the gathering members 24, 26 to bend as required as the discharge end 102 is entered. Thus, both the discharge point and the angle of discharge from the row unit to the inlet of the harvester (not shown) tend to remain substantially constant, independently of variation of row unit placement. Accordingly, there is a free path for entry and a consequent reduction in the amount of buildup in forage adjacent the entry point of the harvester. The location of pivot point 46 is selected to aim the discharge at the best angle for the harvested crops.

A further advantage gained from the use of cantilevered arms 56, 58, 60 permits a more compact structure. The individual support arms are completely under the row units substantially in the center thereof providing maximum stability with the minimum structure.

Referring to still a further possible variation in the inventive structure, it is seen that the rotating cutter 52 may be driven by a gear chain 104 coupled to the idler or driven sprocket 34 in FIG. 2.

The preceeding specification describes an adjustable multiple row harvesting head assembly 10 providing unique individual cantilevered support arms 56, 58, 60 for the plural row units thereof, and adjusting means 64, 66 permitting infinitely variable adjustment of the spacing between the row units. The row units include moveable frame members 44, 48 pivotably mounted on pivot axis 46 disposed forwardly of rear driving sprockets for more efficient transfer of the forage to the harvester.

The foregoing description of preferred embodiments of the invention has been presented for purposes of illustration and description, however, and is not intended to be exhaustive or to limit the invention to the precise forms disclosed, since many obvious modifications and variations are possible in light of the above teaching. The embodiment was chosen and described in order best to explain the principles of the invention and its practical application, thereby to enable others skilled in the art best to utilize the invention in various embodiments and with various modifications as are suited to the particular use contemplated. It is intended that the scope of the invention be defined by the claims appended hereto, when interpreted in accordance with the full breadth to which they are fairly and legally entitled.

I claim:

1. An adjustable multiple row head for a crop harvester comprising:
   (a) a base;
   (b) a plurality of row head units;
   (c) a corresponding plurality of separate cantilevered support arms, each cantilevered support arm fully supporting one of said plurality of row head units;
   (d) said cantilevered support arms connected to and extending forwardly of said base;
   (e) at least one of said row head units including a moveable frame member adjustably pivoted about an axis;
   (f) gathering means associated with said moveable frame member and forming an inlet and a passageway for crops being harvested;
   (g) adjusting means for providing adjustment to said moveable frame member with respect to one of said cantilevered support arms, said adjusting means being positioned adjacent a distal end of said one of said cantilevered support arms forward of said base and inside the width of said at least one row head unit; and
   (h) cutting means at the inlet,
   whereby the inlets to said row head units may be spaced apart from each other and said adjusting means and separate, fully supporting cantilevered support arms provide return run for said gathering means substantially free of obstruction to allow the self cleaning of grasses from the units.

2. An adjustable multiple row head as recited in claim 1 wherein said one cantilevered support arm is fixedly mounted to said base and further comprising guide means for said moveable frame member for support on said cantilevered support member,
   said adjusting means comprising a jackscrew cooperating with said guide means for pivotally adjusting one of said row head units.

3. An adjustable multiple row head as recited in claim 2 wherein said guide means is mounted to said moveable frame member to provide a first engaging point for said jackscrew.

4. An adjustable multiple row head as recited in claim 1 wherein said base provides base support structure for said plurality of cantilevered support members, and
   each gathering means comprises a pair of endless members having cooperating lugs thereon and forming said passageway therebetween, driving sprockets for said endless members supported by said base, idler sprockets adjacent the inlet of the gathering means, and adjustable idler means for adjusting tension in said endless members in accordance with adjustment of said row head units.

5. An adjustable multiple row head as recited in claim 4 wherein said adjustable idler means includes a spring biased adjustable support bracket for adjusting the tension in said endless members responsively to said row head units adjustment.

6. An adjustable multiple row head as rectited in claim 4 wherein the pivot axis for said moveable member is disposed forwardly of an axis of at least one of said driving sprockets to provide a discharge end substantially in the same alignment in any adjusted position.

* * * * *